(12) United States Patent
Jayasena et al.

(10) Patent No.: US 10,268,416 B2
(45) Date of Patent: Apr. 23, 2019

(54) METHOD AND SYSTEMS OF CONTROLLING MEMORY-TO-MEMORY COPY OPERATIONS

(71) Applicant: Advanced Micro Devices, Inc., Sunnyvale, CA (US)

(72) Inventors: Nuwan Jayasena, Sunnyvale, CA (US); David A. Roberts, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 339 days.

(21) Appl. No.: 14/924,881

(22) Filed: Oct. 28, 2015

(65) Prior Publication Data

US 2017/0123670 A1  May 4, 2017

(51) Int. Cl.
G06F 3/06 (2006.01)
G06F 12/08 (2016.01)
G06F 12/0817 (2016.01)

(52) U.S. Cl.
CPC .............. G06F 3/065 (2013.01); G06F 3/061 (2013.01); G06F 3/067 (2013.01); G06F 12/08 (2013.01); G06F 12/0822 (2013.01)

(58) Field of Classification Search
CPC ......... G06F 3/065; G06F 3/0604; G06F 3/067
See application file for complete search history.

(56) References Cited

U.S. PATENT DOCUMENTS

| | | | |
|---|---|---|---|
| 9,645,936 B1* | 5/2017 | Schuttenberg | G06F 12/0875 |
| 2014/0169189 A1* | 6/2014 | Kalkunte | H04L 43/0882 |
| | | | 370/252 |
| 2014/0177347 A1 | 6/2014 | Chatterjee et al. | |
| 2014/0181427 A1* | 6/2014 | Jayasena | G06F 9/3004 |
| | | | 711/154 |
| 2014/0195765 A1* | 7/2014 | Abali | G06F 11/1008 |
| | | | 711/168 |
| 2015/0193158 A1* | 7/2015 | Yoon | G06F 3/0619 |
| | | | 711/103 |

OTHER PUBLICATIONS

Kim et al., "Memory-centric Interconnect Design with Hybrid Memory Cubes", 22nd PACT, Sep. 7-11, 2013, pp. 225-234, Edinburgh.

(Continued)

*Primary Examiner* — Ann J Lo
*Assistant Examiner* — Michelle L Taeuber
(74) *Attorney, Agent, or Firm* — Volpe and Koenig, P.C.

(57) ABSTRACT

A memory-to-memory copy operation control system includes a processor configured to receive an instruction to perform a memory-to-memory copy operation and a memory module network in communication with the processor. The memory module network has a plurality of memory modules that include a proximal memory module in direct communication with the processor and one or more additional memory modules in communication with the processor via the proximal memory module. The system also includes a memory controller in communication with the processor and the network of memory modules. The processor is configured to issue a first command causing data to be copied from a first memory module to a second memory module without sending the data to the processor or the memory controller.

15 Claims, 7 Drawing Sheets

(56) References Cited

OTHER PUBLICATIONS

Roberts, David, "Inter-Device Communication and Sharing in Emerging Memory Systems," in http://www.amd.com/Documents/AMD-Research-Report-2014-1776.pdf, Aug. 2014, 8 pgs.

Seshadri et al., "RowClone: Fast and Energy-Efficient In-DRAM Bulk Data Copy and Initialization", MICRO-46, Dec. 7-11, 2013, 13 pages, Davis, CA, U.S.A.

* cited by examiner

METHOD AND SYSTEMS OF CONTROLLING MEMORY-TO-MEMORY COPY OPERATIONS

TECHNICAL FIELD

The disclosed embodiments are generally directed to methods and systems of providing memory-to-memory copy operations of data in an electronic device and in particular, to direct memory-to-memory copy operations of the data without sending the data through a processor interface. In some embodiments, intelligent memory modules are provided to facilitate the direct memory-to-memory copy operations.

BACKGROUND

Current applications (e.g., big-data analytics, in-memory databases and large-scale High Performance Computing (HPC) simulations) are driving high-performance system architectures to include both large amounts of memory and high memory bandwidths. Conventional approaches for increasing memory capacity include attaching a network of memory modules to each physical memory port on a processor. Conventional approaches for increasing available memory bandwidth include multi-channel (e.g., dual, triple and quad) memory architecture that increases the available number of mediums (e.g., wires) to communicate with memory (e.g., random access memory (RAM)).

Decisions of whether to use large amounts of memory or high memory bandwidths often exert contradictory or competing pressures on hardware design. Demands for higher-performance memories (larger memory bandwidth) typically lead to choices that reduce the amount of memory modules that can be accommodated in conventional systems. For example, while prior double data rate (DDR) (utilizing both the rising and falling edge of a system clock to potentially double the memory speed) standards have supported multiple dual in-line memory modules (DIMM)s per memory channel, DDR4 currently supports a single DIMM per channel to improve higher-frequency operation. Similarly, some conventional memory interfaces based on high-performance serial interfaces attach a single memory module directly to a memory channel port on a processor. Some conventional systems (e.g., Hybrid Memory Cube (HMC)) attempt to maintain large memory capacity by attaching a network of memory modules including a plurality of memory modules connected to the single memory module attached directly to the memory channel port on the processor.

SUMMARY OF EMBODIMENTS

Embodiments provide a memory-to-memory copy operation control system. The system includes a processor configured to receive an instruction to perform a memory-to-memory copy operation. The system also includes a first memory module network in communication with the processor. The first memory module network has a first plurality of memory modules that include a first network proximal memory module in direct communication with the processor and one or more first network additional memory modules in communication with the processor via the first network proximal memory module. The system also includes a memory controller in communication with the processor and the first network of memory modules. The processor is configured to issue a first command causing data to be copied from a first memory module of the first plurality of memory modules to a second memory module of the first plurality of memory modules without sending the data to the processor or the memory controller.

Embodiments include a method of providing memory-to-memory copy operations that includes receiving, by a processor, an instruction to perform one of the memory-to-memory copy operations. The method also includes issuing, by the processor, a first command to a first memory module network having a first plurality of memory modules. The method further includes causing the first memory module of the first plurality of memory modules, to copy data to a second memory module of the first plurality of memory modules without sending the data to the processor or a memory controller in communication with the processor and the first network of memory modules.

Embodiments include a tangible, non-transitory computer readable medium that includes instructions for causing a computer to execute a method of providing memory-to-memory copy operations. The instructions include providing an instruction to perform one of the memory-to-memory copy operations, issuing a first command to a first memory module network having a first plurality of memory modules and causing the first memory module of the first plurality of memory modules to copy data to a second memory module of the first plurality of memory modules without sending the data to the processor or a memory controller in communication with the processor and the first network of memory modules.

BRIEF DESCRIPTION OF THE DRAWINGS

A more detailed understanding may be had from the following description, given by way of example in conjunction with the accompanying drawings wherein.

DETAILED DESCRIPTION

Memory-to-memory copy operations are incurred by applications as well as system software (e.g., copy-on-write by the operating system (OS) on process creation, as a result of page-level de-duplication by virtual machines (VMs)). In conventional methods and systems, data is copied in a processor from one region of memory to another by reading the source data into the processor (e.g., one cache line at a time) and writing it out (e.g., one cache line at a time) to the destination memory region, resulting in a read and a write over the processor's memory interface. Alternatively, a Direct Memory Access (DMA) engine can be programmed to perform larger or more complex copy operations using sequences of read and write commands.

When a network of memory modules is attached to each physical memory port on a processor, conventional data copying includes a read and a write over the processor's memory interface and incurs two traversals over a network of memory modules. For example, two processor memory commands (a load and a store) produce two data transfers via processor memory interface. When the processor issues a load command, the command is sent to the source memory module via the memory module network including any intermediate memory modules connected between the processor and the source memory module. The source data is then read from the source memory module and is sent back to the processor across the network including any intermediate memory modules. When the processor issues a store command, the store command is sent to the destination memory module via the memory module network including any intermediate memory modules between the processor and the destination memory module. The copy data, including the data, is sent to the destination memory module via the memory module network including any intermediate memory modules between the processor and the destination memory module. In some cases, the copy data sent from the processor may traverse back through the source memory module (from which the originally data was read) to the destination memory module.

Embodiments provide systems and methods to support direct data transfers between memory modules without traversing the processor to reduce copy-based traffic on the memory network, reduce memory bandwidth at the processor interface, and reduce the load on the processor. Embodiments include direct reading from the source memory module and transfer to the destination module without a round-trip through the processor and with a single traversal of any one memory module in the memory network, providing a reduction in copy-related traffic on the memory network.

Embodiments provide processor mechanisms to issue efficient memory copy operations to a network of memory modules. Embodiments provide memory module mechanisms to support efficient copy operations across interconnected memory modules. In some embodiments, the memory modules may be intelligent modules that include multiple memory types and automated data mapping logic, e.g., a solid-state disk. In these embodiments, an intelligent memory module (e.g., source memory module) may receive a copy command, encode data and issue a command (e.g., a store command) comprising the encoded data to another memory module (e.g., destination memory module) to copy the encoded data. Embodiments may also include state machines to implement copy operations and sequence multiple reads and writes used to complete a request.

Embodiments provide software mechanisms to improve the effectiveness of the hardware aspects in systems with multiple, disjoint memory networks.

In some embodiments, direct memory-to-memory copy operations may be performed without memory modules issuing a command (e.g., a store command). For example, a processor may issue multiple commands (e.g., load to copy command and deferred store command) to perform direct memory-to-memory copy operations.

Figure 1:
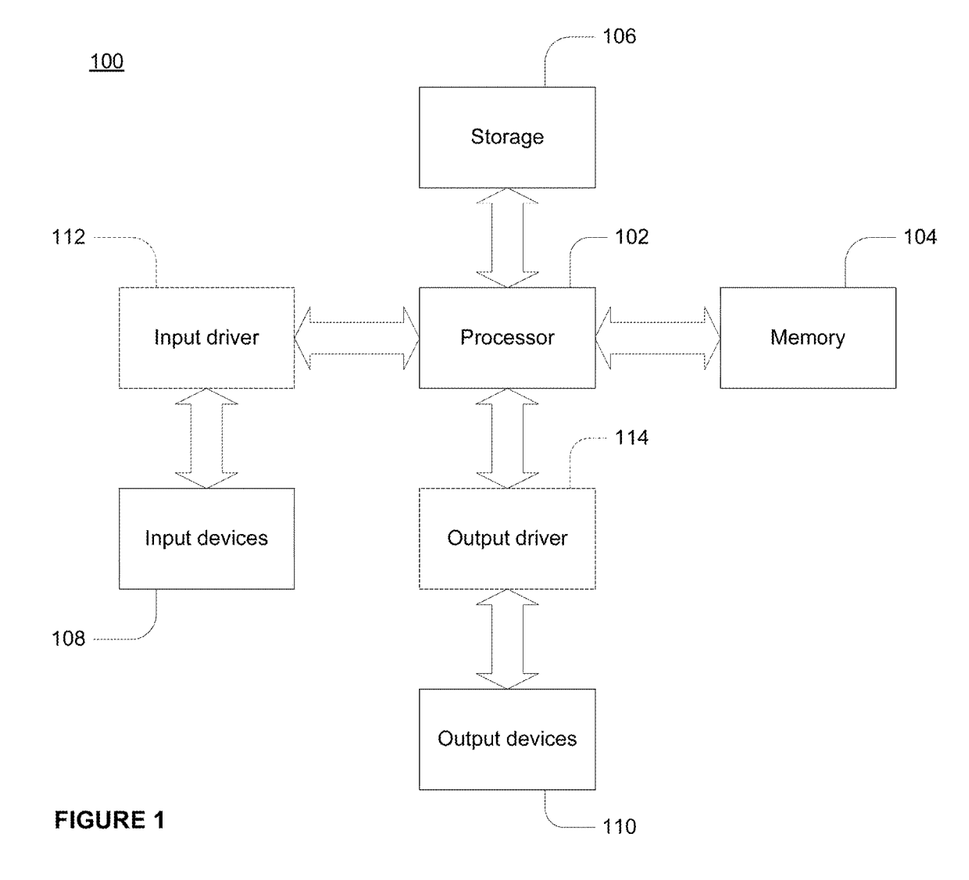
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2A:
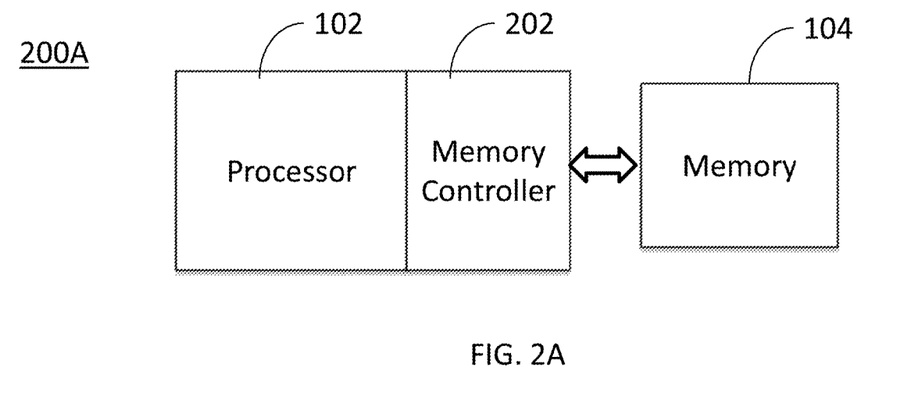
FIG. 2A is a block diagram of an exemplary system having an integrated memory controller for controlling memory-to-memory copy operations for use with embodiments disclosed herein.

Data and instructions or commands between processor 102 and memory 104, may be implemented by a memory controller 202. Embodiments may include systems having one or more memory controllers 202 integrated with the processor 102. FIG. 2A is a block diagram of an exemplary system 200A having an integrated memory controller 202 for controlling memory-to-memory copy operations. As shown in FIG. 2A, the system 200A may include processor 102, an integrated memory controller 202 and memory 104. The system 200A may also include a dedicated bus (not shown) for direct memory access to memory 104. In embodiments using the system in FIG. 2A, the processor 102 may receive instructions to perform direct memory-to-memory copy operations and initiate the operations via the integrated memory controller 202. The processor 102 may then be free to perform other operations while the direct memory-to-memory copy operations are performed. The processor 102 may receive an indication (e.g., interrupt) from the memory controller 202 when the operations are completed.

Figure 2B:
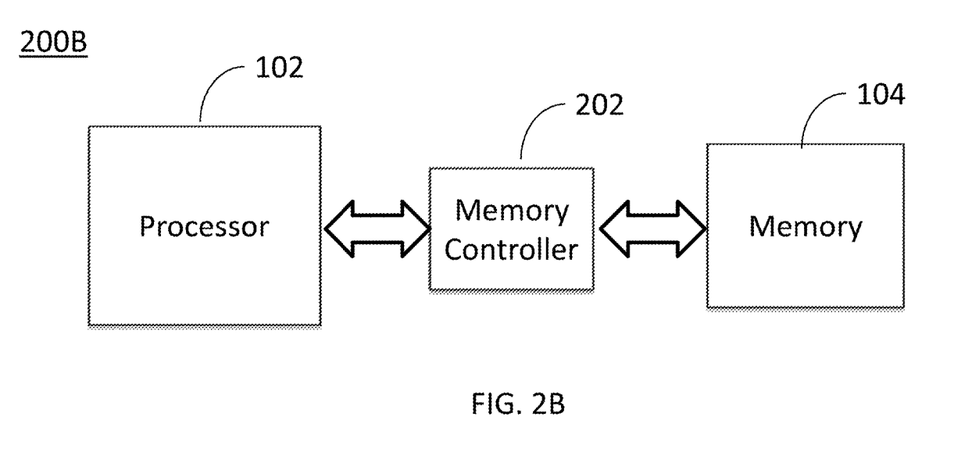
FIG. 2B is a block diagram of an exemplary system having a non-integrated memory controller for controlling memory-to-memory copy operations for use with embodiments disclosed herein.

Embodiments may also include systems having one or more memory controllers 202 separate from the processor 102. FIG. 2B is a block diagram of an exemplary system having a non-integrated memory controller 104 for controlling the memory-to-memory copy operations. As shown in FIG. 2B, the system 200B may include processor 102, a memory controller 202 separate from the processor and memory 104.

In some embodiments, a single memory controller 202 may be used to control memory-to-memory copy operations of a multi-channel memory system. In some embodiments, a plurality of memory controllers 202 may be used to control memory-to-memory copy operations. For example, in multi-channel memory systems, a memory controller 202 may be used to control each memory channel of a processor 102.

Figure 3:
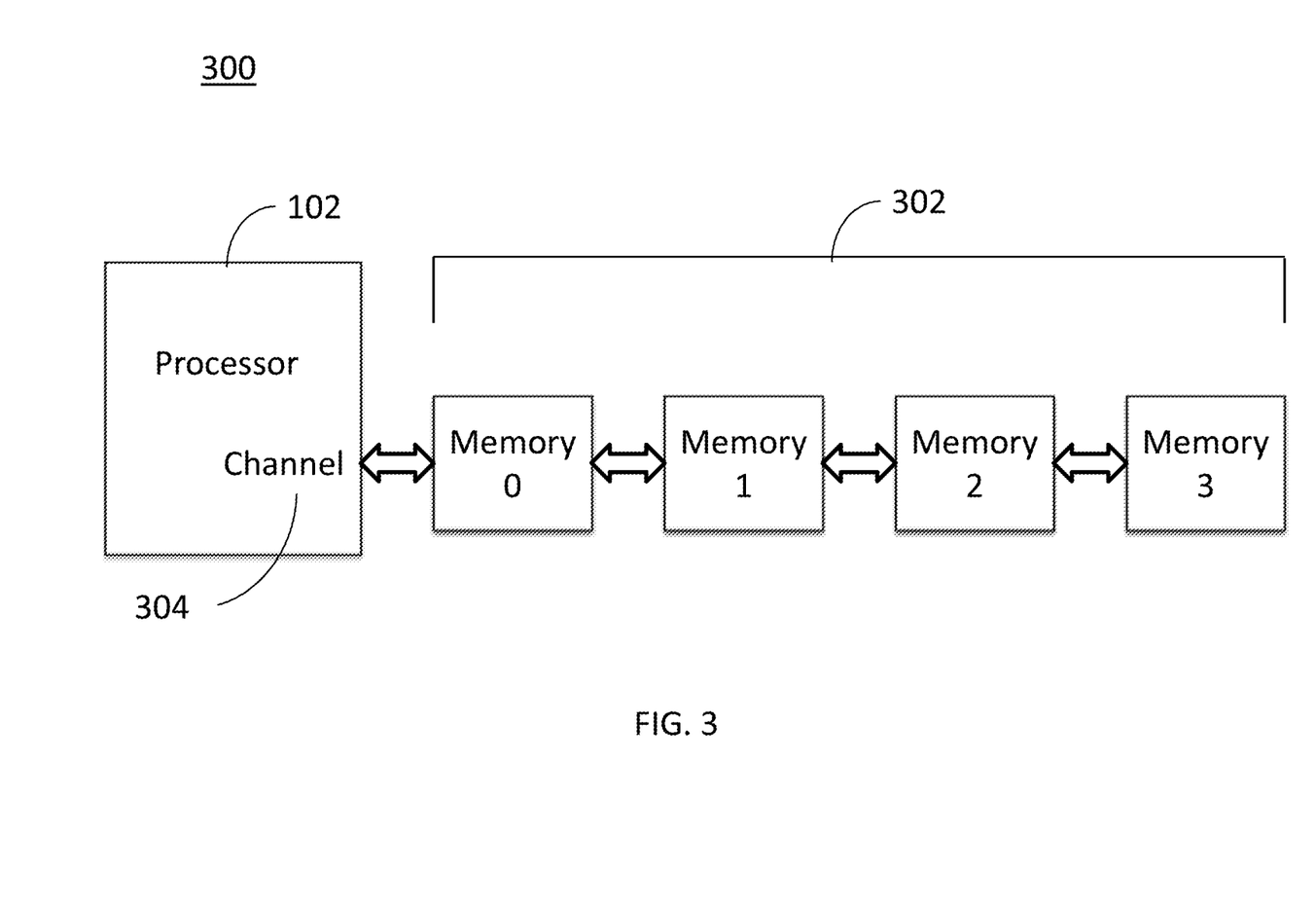
FIG. 3 is a diagram of an exemplary system having a network of memory modules in communication with a single memory channel which may be used with embodiments described herein.

Memory 104 may include a network of memory modules. FIG. 3 is a diagram of an exemplary system 300 having processor 102 and a network 302 of memory modules (Memory 0, Memory 1, Memory 2 and Memory 3) in communication with a single memory channel 304 which may be used with embodiments described herein.

Each memory module may be any type of memory (e.g., a dynamic random access memory (DRAM) integrated circuit module) that includes storage areas or registers (e.g., capacitors) used to store bits of data. The registers may include, for example, memory address registers, bit/byte count registers, and control registers that can be written to and read by the processor 102. Control registers may specify the channel 304 (corresponding to the memory input/output (I/O) port) to be used, the direction of the data movement (e.g., copy command to source register, and load to copy command and defer to store command). The commands and direction of data movement is described in more detail below. Memory modules may include, for example, dual in-line package (DIP), dual in-line pin package (DIPP), a transflash memory module (e.g., memory card), a single in-line pin package (SIPP), a single in-line memory module (SIMM), and a dual in-line memory module (DIMM).

In some embodiments, a memory controller (e.g., controller 202) may use memory modules without computing capabilities to issue store operations to each other. In some embodiments, a memory controller (e.g., controller 202) may be used to control memory-to-memory copy operations (e.g., one memory module issuing a store operation to another memory module) using memory modules with computing capabilities. In some embodiments, the memory modules may be intelligent modules that include multiple memory types and automated data mapping logic (e.g., a solid-state disk). Intelligent memory modules may also include logic circuitry (e.g., gates, switches, to route and/or forward requests, instructions and/or data to other memory modules in the network). Memory controller 202 may be configured to utilize the logic in the intelligent memory modules to perform the direct memory-to-memory copy operations.

As shown in FIG. 3, the network of memory modules may be daisy chained and may include a proximal memory module (Memory 0) in direct communication (e.g., connected) to the first channel 304 of the processor 102 at a single memory port and additional memory modules (Memory 1, Memory 2 and Memory 3). Each memory module (Memory 0, Memory 1, Memory 2 and Memory 3) of the memory module network 302, including the first memory module (Memory 0) and each of the additional memory modules (Memory 1, Memory 2 and Memory 3) are connected in series.

The daisy chain network 302 shown in the embodiment at FIG. 3 is merely exemplary and is being used for simplified explanation. Embodiments may include other types of networks, such as for example, ring networks, mesh networks, torus networks or tree networks. The daisy chaining of the memory modules (Memory 0, Memory 1, Memory 2 and Memory 3) shown in FIG. 3 is merely exemplary. Embodiments may include different configurations of memory modules connected to a first memory module than the daisy chained configuration shown in FIG. 3. The number of memory modules shown in FIG. 3 is also exemplary. Embodiments may include memory module networks having any number of memory modules connected to a single channel of the processor at a single memory port via a first memory module.

Figure 4:
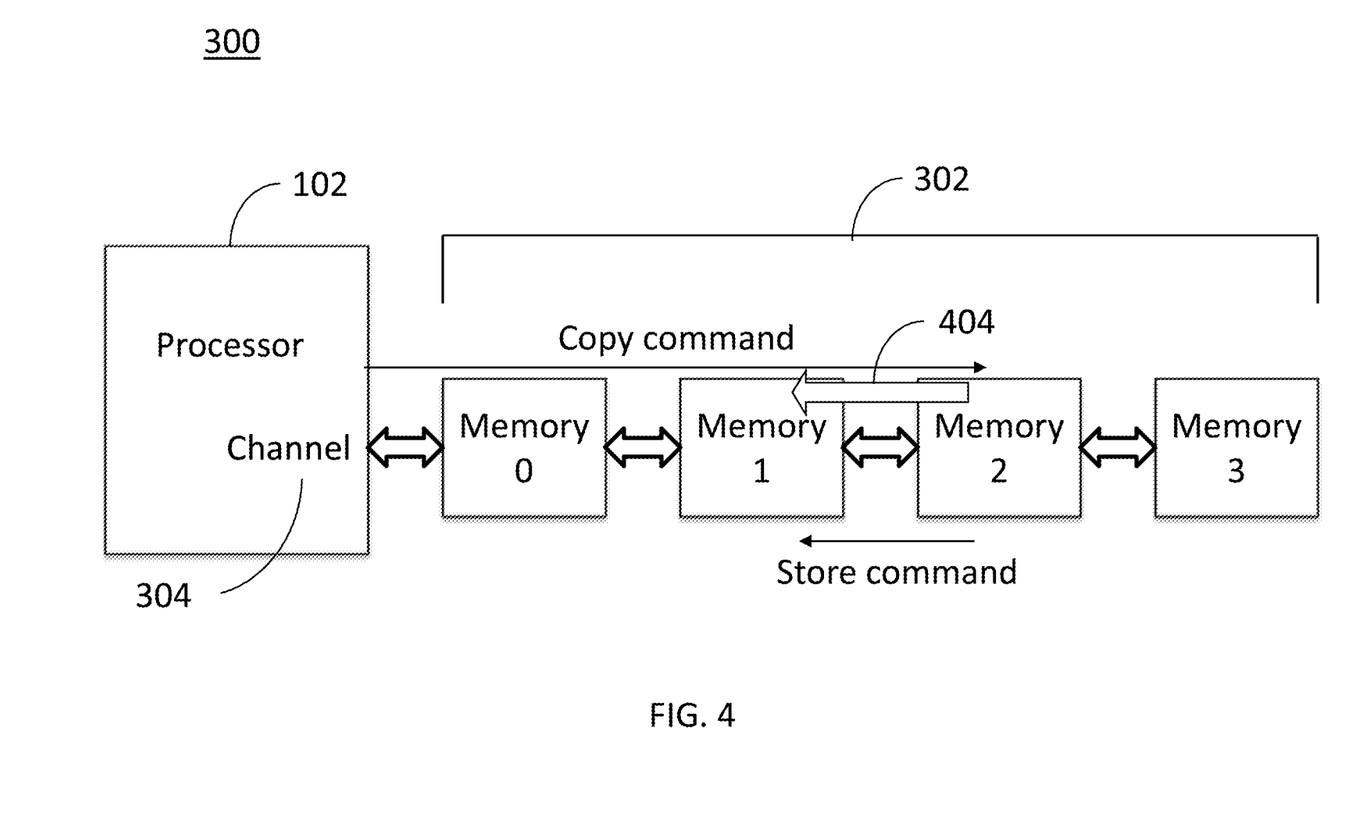
FIG. 4 is a functional block diagram of the exemplary system shown in FIG. 3 illustrating an exemplary memory-to-memory copy operation according to embodiments disclosed herein.

FIG. 4 is a functional block diagram of the exemplary system 300 shown in FIG. 3 illustrating an exemplary memory-to-memory copy operation according to embodiments disclosed herein. The processor 102 may receive instructions (e.g., programmed operation instructions) to perform direct memory-to-memory copy operations. The processor 102 may issue a copy command to copy data from one memory module (e.g., a source memory module, such as Memory 2) to another memory module (e.g., a destination memory module, such as Memory 1).

In some embodiments, the processor 102 may issue the command to the memory controller 202 (e.g., to memory controller 202 integrated with the processor). The memory controller 202 may then issue the copy command (or Loadc command and Dstore command shown in FIG. 5) to free up the processor 102 for other operations. The processor 102 may initialize the memory controller 202 with the copy command and the memory controller 202 may provide addresses and read/write control information (e.g., via dedicated control lines or a packet-based command interface).

In other embodiments, the processor 102 may issue the copy command directly to a memory module (e.g., the source memory module, such as Memory 2) in the memory module network 302. The copy command may include a source memory module physical address and the destination memory module physical address. In some embodiments, the command may include a destination memory module identifier. The destination memory module identification may also be determined from the destination memory module physical address. The copy command may be encoded on a memory interface with the destination address (and in some embodiments, the destination memory module ID) encoded in a subset of copy command data fields.

As described above, in some embodiments, the copy command may be sent from the processor 102 to the memory controller 202 and the memory controller 202 may then issue the copy command or other commands to perform the direct memory-to-memory operations. For simplicity of explanation, in the embodiment illustrated in FIG. 4 the copy command is sent from the processor 102 to the source memory module (Memory 2). The copy command is received by the source memory module (Memory 2). The data 404 is then sent by the source memory module (Memory 2) to the destination memory module (Memory 1). Instead of returning the data 404 to the processor 102 (or the memory controller 202), however, the source memory module (Memory 2) encodes the data 404 in a store command and sends the encoded data 404 directly to the destination memory module (Memory 1) without being sent to the processor 102. An acknowledgement of completion may also be sent to the requester as well, either from Memory 1 or Memory 2 when the store is complete. The destination physical address, and in some embodiments, the destination memory module identification is also sent to the destination memory module (Memory 1) along with the encoded data.

Accordingly, the copy operation illustrated in FIG. 4 uses a single processor command, includes no data movement over the processor or the memory controller and provides direct memory-to-memory data transfer. Further, the memory controller 202 is configured to control the source memory module (Memory 2) to copy data 404 from the source memory module (Memory 2) to a destination memory module (Memory 1) without sending the data to the processor 102.

Some embodiments may include a data length specifier (either as a field or as part of the opcode), which in turn is reflected in the store command issued by the source memory module to the destination memory module. Embodiments may also include a bitmask (in addition to or in lieu of a length specifier) to indicate a subset of the memory access block to be copied. In these embodiments, the bitmask is included in the store command sent to the destination.

Because the source memory module issues a separate store command that is routed over the network of memory modules to the destination memory module, the command is amenable to arbitrary memory module network topologies.

In some embodiments, the copy command may be issued to the destination memory module which orchestrates the data copy. In this embodiment, the source memory module does not generate a separate store command, but rather sends a read response to the read requestor, which is the destination module. The destination module may then write the data to the destination address. Issuing the copy command to the destination memory module may provide lower latency for the requester to receive destination memory errors, such as an addressing error relating to faulty memory regions.

In one embodiment, the processor may issue a copy command on a cache line granularity. Embodiments may orchestrate larger or smaller block data copies, however, by setting appropriate data length fields.

Large block transfers such as operating system pages (e.g., 4 KB or more) may adversely affect the latency of other traffic on the links between the source memory module and destination memory module. Therefore, a copy engine (similar to a DMA engine) may be used to complete the transfer. The engine may be used to break the total data transfer into smaller interface packets and send the packets to the destination, possibly out-of-order. The receiving copy engine may buffer and/or re-assemble the smaller packets to complete the data transfer.

Figure 5:
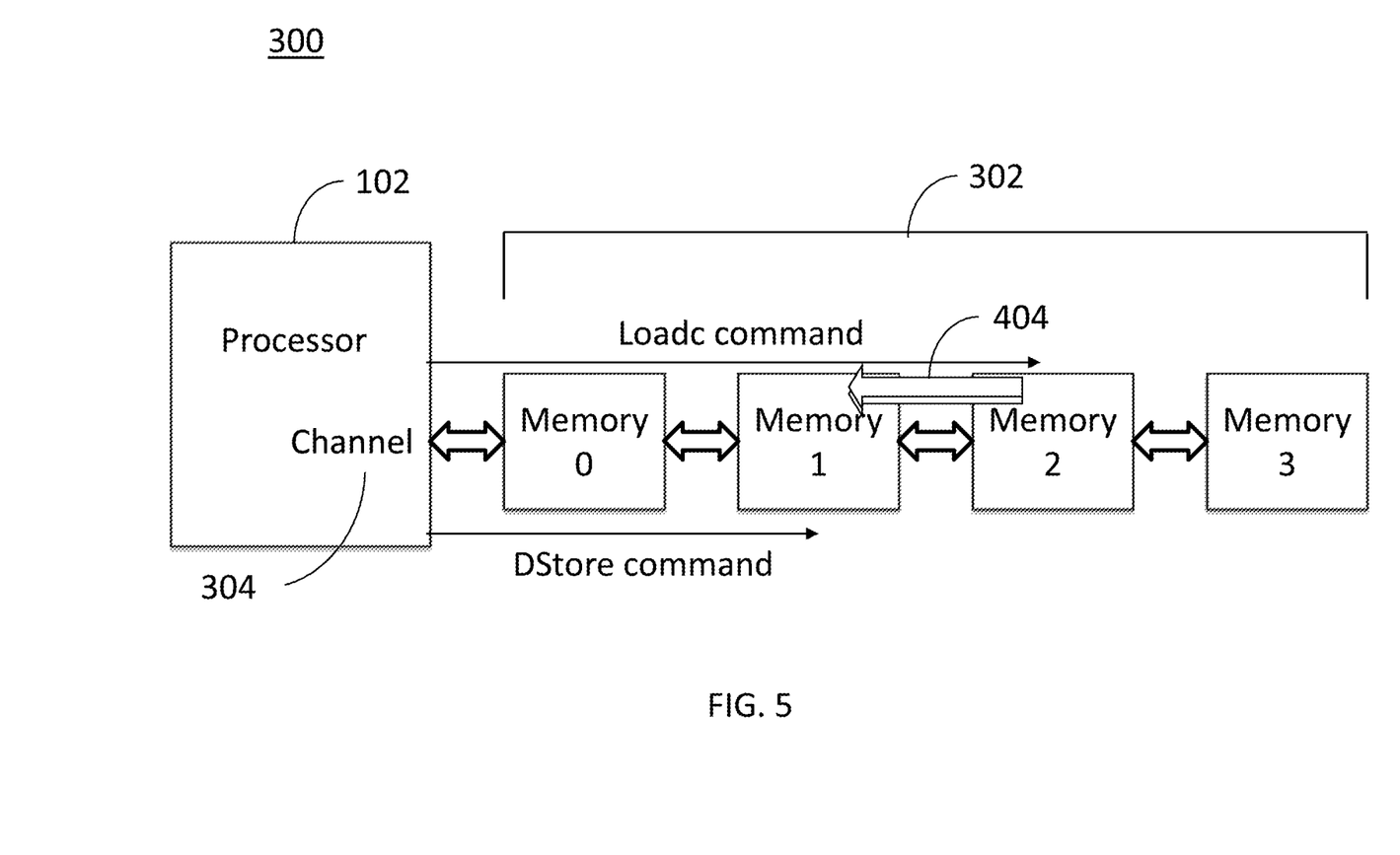
FIG. 5 is a functional block diagram of the exemplary system 300 shown in FIG. 3 illustrating an exemplary direct memory-to-memory copy operation using two processor commands according to embodiments disclosed herein.

In some embodiments, direct memory-to-memory copy operations may be performed without memory modules issuing a command (e.g., a store command). FIG. 5 is a functional block diagram of the exemplary system 300 shown in FIG. 3 illustrating an exemplary direct memory-to-memory copy operation using two processor commands according to embodiments disclosed herein. As shown in FIG. 5, the copy operations may be performed by the processor 102 issuing a load to copy (Loadc) command and a deferred store (Dstore) command. In the embodiments where the processor 102 issues commands to the memory controller 202, the Loadc command and the Dstore command may then be issued by the memory controller 202.

The Loadc command is sent to a memory module in the network 302, such as the source memory module (Memory 2). The Loadc command may include the physical address of the source memory module (Memory 2), a tag T that is unique among different Loadc commands currently being sent across the memory module network 302 and a response path specifier (RPS) that identifies the network route to the destination memory module (Memory 1).

The Dstore command may also be issued to a memory module in the network 302, such as the destination memory module (Memory 1). The Dstore command may include the destination physical address and the same tag T as the corresponding Loadc command. The source memory module (Memory 2) may send the data along with the tag T according to the RPS in the Loadc command. The RPS may specify route information from the source module to the destination module. For example, in a daisy-chain configuration, the RPS may simply specify whether the destination module is upstream of the source or downstream of the source relative to the processor 102. In the configuration shown at FIG. 5, the RPS may simply specify that the destination module is downstream (Memory 1) relative to the processor. The RPS may also specify more detailed directions along the route when each of the memory modules are not connected in series. In some embodiments, intelligent memory modules may include routing mechanisms to specify route information so that the Loadc command does not have to specify the route information.

When the destination memory module (Memory 1) receives the Dstore command, the destination memory module (Memory 1) begins monitoring load data passing through and compares the tags of each load data to the tag T of the Dstore command. When a tag match is detected, the corresponding load data is then used as the payload to perform a store corresponding to the Dstore command. In some embodiments, the load data is not forwarded from the destination memory module. In other embodiments, the load data may include an indication to be forwarded. Embodiments may include Dstore commands having a length specifier and/or a bitmask to cause a subset of the load data block to be written to the destination.

Systems may include multiple Loadc-Dstore command pairs in-flight at any one point or interval of time or a number of clock cycles. The pairs may include pairs that share the same source and/or destination). Embodiments may provide a limit on the number of supported in-flight pairs at any one point or interval of time.

In some embodiments, the commands are issued in an order such that the Dstore command reaches the destination module before the load response from the Loadc command reaches the destination node. In a daisy-chained configuration of memory modules, the ordering may include issuing the Dstore before (e.g., immediately) issuing the Loadc command as long as ordering is maintained among all packets in the network (commands and data). In more complex configurations with arbitrary networks, other techniques may be provided. In network configurations with a small number of memory modules (e.g., equal to or below a memory module threshold), the RPS may be omitted and the load data may be broadcast to all other memory modules.

Embodiments may also allow specification of multiple destinations as part of the copy. Accordingly, the Loadc command may specify multiple targets (multiple Dstore commands are sent with the same tag) and may take advantage of broadcast capability in the interconnect fabric. For example, if a processor wants to simultaneously read a page as well as initiate a copy, the processor may set its own cache or local scratchpad memory as an additional target to receive the data. In a snooping bus arrangement, multiple Dstore targets may obtain the data in the same period of time. In a chained organization, data may be read and stored by the first target memory while continuing to stream the data to another memory or host target further downstream in a pipelined fashion.

Figure 6:
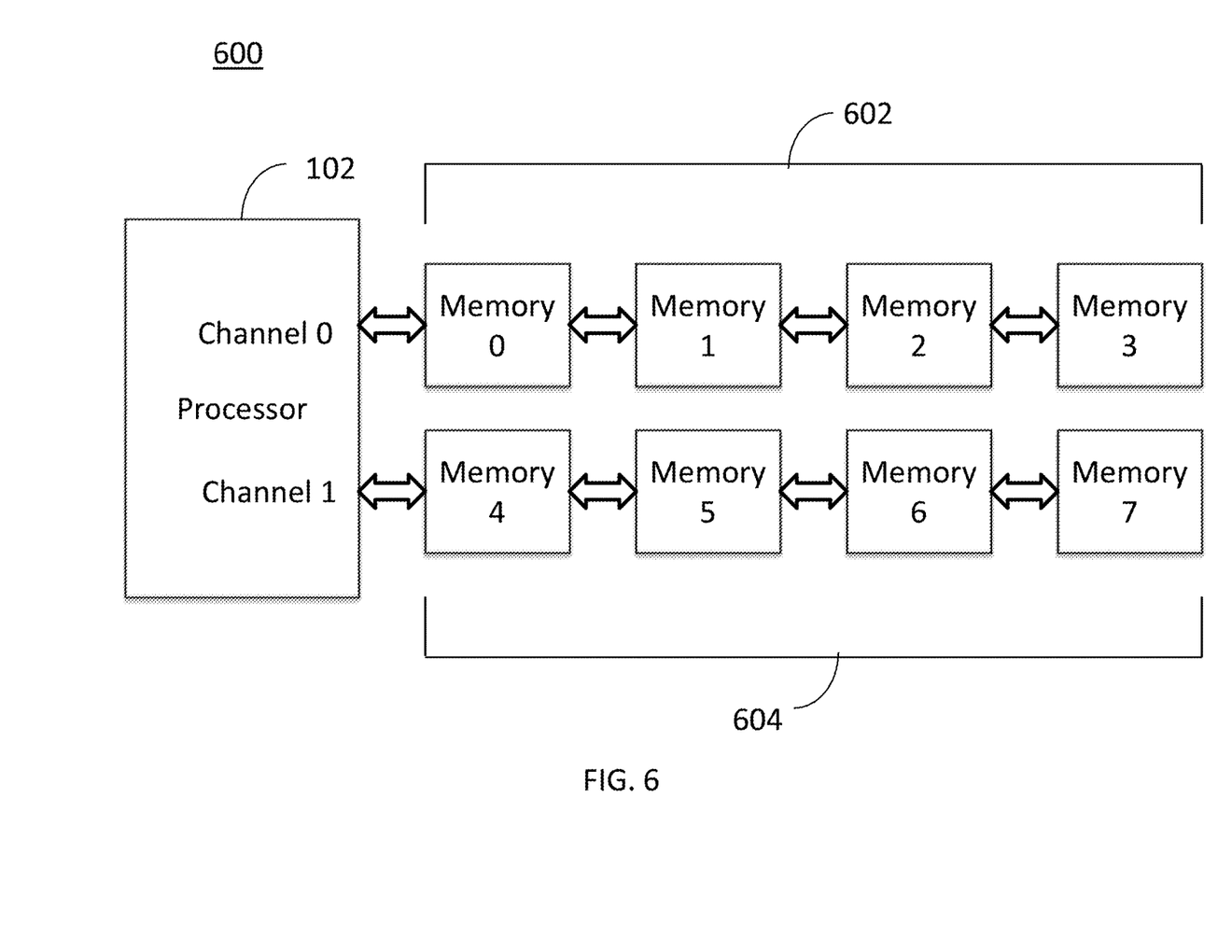
FIG. 6 is a diagram of an exemplary system having a first network of memory modules in communication with a first memory channel and a second network of memory modules in communication with a second memory channel which may be used with embodiments described herein.

In some embodiments, processors with multiple memory channels may implement multiple, disjoint memory networks. FIG. 6 is a diagram of an exemplary system 600 which may be used with embodiments described herein. As shown in FIG. 6, the system 600 includes a processor 102 having a first memory channel (Channel 1) and a second memory channel (Channel 2). The system 600 also includes a first network 602 of memory modules (Memory 0, Memory 1, Memory 2 and Memory 3) in communication with Channel 1 and a second network 604 of memory modules (Memory 4, Memory 5, Memory 6 and Memory 7) in communication with Channel 2.

In some embodiments, the source memory module and the destination memory module are within the same memory network. In such systems, system-software-initiated copies (e.g., copy-on-write) are optimized to explicitly allocate the destination pages within the same memory network as the corresponding source pages. The number of channels and the number of memory modules connected to each channel shown in FIG. 6 is exemplary. Embodiments may include systems having any number of channels and any number of memory modules connected to each channel. The daisy chain configurations shown in FIG. 6 are also exemplary.

Embodiments may include systems where memory is fine-grain interleaved (e.g., at cache-line granularity) among the processor's memory channels where the system software ensures that the source and destination regions are aligned such that the source and destination for each block of data (e.g., cache line) are in the same channel.

In some embodiments, when memory is being allocated that is known to hold a copy of an existing data structure, a specific memory allocation command may be used that identifies the source data such that the newly allocated data is placed in a manner that aligns with the memory channels holding the source data.

Applications may be profiled (off-line or online) to determine occurrences of memory copies and their data sources, thereby "learning" how to allocate on future instances to enable copies to be performed within each memory channel.

Figure 7:
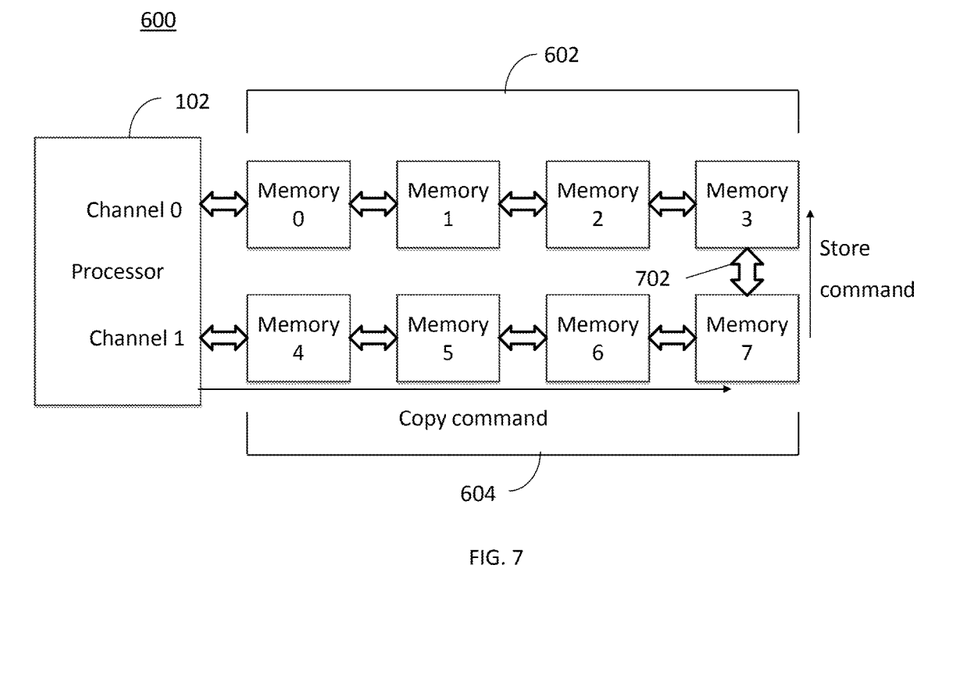
FIG. 7 is a diagram of the exemplary system shown in FIG. 6 having communication pathways connecting memory modules of different channels according to embodiments disclosed herein.

Embodiments may also include one or more communication pathways connecting memory modules of different channels. For example, FIG. 7 is a diagram of the exemplary system 600 shown in FIG. 6 that includes processor 102 having Channel 1 and Channel 2, the first network 602 of memory modules (Memory 0, Memory 1, Memory 2 and Memory 3) in communication with Channel 1 and the second network 604 of memory modules (Memory 4, Memory 5, Memory 6 and Memory 7) in communication with Channel 2. As shown in FIG. 7, system 700 also includes communication pathway 702 which connects memory module 7 of channel 1 and memory module 3 of channel 0. Accordingly, memory-to-memory copy operations for memories on different networks (connected to different channels) may be performed without sending data through the processor 102 (or memory controller 202). Embodiments may include any number of communication pathways connecting memory modules of different memory networks.

In some embodiments, the completion of a copy command may generate a signal back to the processor 102. Similarly, in some embodiments, the memory system may provide ordering such that when a conflicting command is issued before a copy command issues, the conflicting command is completed before the copy command is performed. The memory system may also provide ordering such that when a conflicting command is issued after a copy command issues, the copy command is completed before the conflicting command is performed.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:
1. A memory-to-memory copy operation control system comprising:
   a processor configured to receive an instruction to perform a memory-to-memory copy operation; and
   a first memory module network in communication with the processor, the first memory module network having a plurality of memory modules comprising:
      a first network proximal memory module in direct communication with the processor; and
      one or more first network additional memory modules in communication with the processor via the first network proximal memory module;
   wherein the processor is configured to:
      issue a first command to a source memory module of the plurality of memory modules, the first command: (i) instructing data in the source memory module to be copied to a destination memory module of the plurality of memory modules; and (ii) comprising a first tag that is unique among a plurality of first commands; and
      issue a second command to the destination memory module, the second command comprising a second tag matching the first tag,
   wherein the first command and the second command are issued in an order such that the second command reaches the destination memory module before the data in the source memory module reaches the destination memory module, and when a tag match is detected between the first tag and the second tag at the destination memory module, the destination memory module stores the data in memory of the destination memory module.

2. The system of claim 1, wherein the first command comprises a physical address of the source memory module and a destination address of the destination memory module.

3. The system of claim 1, wherein the first command further comprises a destination memory module identifier.

4. The system of claim 1, wherein the first command comprises a physical address of the source memory module and a response path specifier (RPS) that identifies a network route to the destination memory module, the first command causing the source memory module to send the data as load data along the network route identified by the RPS, and the processor is further configured to issue the second command to the destination memory module, the second command including a destination physical address.

5. The system of claim 1, wherein when the destination memory module receives the second command, the destination memory module begins monitoring tags of first commands passing through and compares the monitored tags of each first command to the second tag issued in the second command, and the tag match is detected when the destination memory module determines that a monitored tag matches the second tag issued in the second command.

6. The system of claim 1, wherein the data is copied from the source memory module to the destination memory module without sending the data to any of the memory modules more than once.

7. The system of claim 1, wherein the processor, and each of the memory modules are connected in series in a daisy chain configuration, and the second command is issued by the processor before the first command is issued by the processor.

8. The system of claim 1, wherein the processor includes a first memory channel and the first memory module network is in communication with the processor via the first memory channel, the system further comprises a second memory module network in communication with the processor via a second memory channel, the second memory module network having another plurality of memory modules comprising:

a second network proximal memory module in direct communication with the processor via the second memory channel; and one or more second network additional memory modules in communication with the second memory channel via the second network proximal memory module, wherein the second memory module network comprises the destination memory module, and the first command instructs the data to be loaded to the source memory module and copied to the destination memory module via a communication pathway connected to one of the memory modules in the first memory module network and one of the memory modules in the second memory module network.

9. A method of performing memory-to-memory copy operations, the method comprising:

receiving, by a processor, an instruction to perform a memory-to-memory copy operation;

issuing, by the processor:

a first command to a source memory module of a first memory module network having a plurality of memory modules, the first command: (i) instructing data in the source memory module to be copied to a destination memory module of the plurality of memory modules; and (ii) comprising a first tag that is unique among a plurality of first commands; and a second command to the destination memory module, the second command comprising a second tag matching the first tag, and wherein the first command and the second command are issued by the processor in an order such that the second command reaches the destination memory module before the data in the source memory module reaches the destination memory module, and when a tag match is detected between the first tag and the second tag at the destination memory module, the destination memory module stores the data in memory of the destination memory module.

10. The method of claim 9, wherein the first command comprises a physical address of the source memory module and a destination address of the destination memory module.

11. The method of claim 9, further comprising:

monitoring tags of first commands passing through the destination memory module when the destination memory module receives the second command;

comparing the monitored tags of each first command to the second tag issued in the second command;

determining whether a monitored tag matches the second tag issued in the second command; and storing the data corresponding to the monitored tag at the destination memory module when the tag match is detected.

12. The method of claim 9, wherein the data is copied from the source memory module to the destination memory module without sending the data to any of the memory modules more than once.

13. The method of claim 9, wherein the first memory module network is in communication with the processor via a first memory channel; and a second memory module network is in communication with the processor via a second memory channel, the second memory module network having another plurality of memory modules:

wherein issuing the first command further comprises copying the data from the first memory module in the first memory module network to the destination memory module in the second memory module network via a communication pathway connected to one of the memory modules in the first memory module network and one of the memory modules in the second memory module network.

14. A tangible, non-transitory computer readable medium comprising instructions for causing a computer to execute a method of performing memory-to-memory copy operations, the instructions comprising:

issuing a first command to a source memory module of a first memory module network having a plurality of memory modules, the first command: (i) instructing data in the source memory module to be copied to a destination memory module of the plurality of memory modules; and (ii) comprising a first tag that is unique among a plurality of first commands; and issuing a second command to the destination memory module, the second command comprising a second tag matching the first tag, and wherein the first command and the second command are issued in an order such that the second command reaches the destination memory module before the data in the source memory module reaches the destination memory module, and when a tag match is detected between the first tag and the second tag at the destination memory module, the destination memory module stores the data in memory of the destination memory module.

15. The method of claim 9, wherein the second command is issued by the processor before the first command is issued by the processor.

* * * * *